Dec. 24, 1968  J. P. ZACHEK  3,417,513
FINISHING MACHINE

Filed Sept. 30, 1965  6 Sheets-Sheet 1

INVENTOR
JOSEPH P. ZACHEK
BY Dominik & Stein
ATTYS

Dec. 24, 1968  J. P. ZACHEK  3,417,513
FINISHING MACHINE

Filed Sept. 30, 1965  6 Sheets-Sheet 2

FIG. 3

INVENTOR
JOSEPH P. ZACHEK
BY Dominik & Stein
ATTYS

Dec. 24, 1968    J. P. ZACHEK    3,417,513
FINISHING MACHINE

Filed Sept. 30, 1965    6 Sheets-Sheet 4

INVENTOR
JOSEPH P. ZACHEK

BY Dominik & Stein

ATTYS.

Dec. 24, 1968   J. P. ZACHEK   3,417,513
FINISHING MACHINE
Filed Sept. 30, 1965   6 Sheets-Sheet 5

INVENTOR
JOSEPH P. ZACHEK
BY Dominik & Stein
ATTYS.

Dec. 24, 1968    J. P. ZACHEK    3,417,513
FINISHING MACHINE

Filed Sept. 30, 1965    6 Sheets-Sheet 6

INVENTOR.
JOSEPH P. ZACHEK
BY Dominik & Stein
ATTYS.

3,417,513
FINISHING MACHINE
Joseph P. Zachek, Hilbert, Wis. 54129
Continuation-in-part of application Ser. No. 384,439, July 22, 1964. This application Sept. 30, 1965, Ser. No. 491,711
10 Claims. (Cl. 51—180)

ABSTRACT OF THE DISCLOSURE

Apparatus for finishing the side wall surfaces of walls including a pair of housing assemblies which are adapted to straddle the wall and having a driving assembly fixedly mounted between them and arranged to ride on the top surface of the wall. Finishing means are secured to each of the housing assemblies and are adapted to be longitudinally positionably adjustable independently of each other.

---

The present invention is a continuation-in-part application of a copending application Ser. No. 384,439 filed July 22, 1964 by Joseph P. Zachek, now United States Patent 3,348,342, dated Oct. 24, 1967, and relates to apparatus for finishing the side wall surface or surfaces of elongated wall-like members.

The apparatus of the present invention like that of the above mentioned copending application is particularly applicable for finishing the side wall surface or surfaces of elongated wall-like members which are made of concrete or the like, such as concrete abutments, concrete wall and concrete railings. The apparatus is also equally applicable, with or without modifications, for finishing elongated wall-like members which are made of material other than concrete, as will be apparent from the detailed description which follows.

In the illustrative embodiment, the apparatus is shown and described as used for finishing the side wall surfaces of concrete railings, which may be the concrete railings constructed adjacent the roadbed of a bridge. Concrete railings of this type are generally constructed by pouring concrete into forms which define the outlines of the concrete railings, allowing the concrete to set up, and then removing the forms. When constructed in this, or a similar manner, the side walls lack a smooth exterior face and are characterized by small surface irregularities, such as small "pot" holes and the like.

In the past, these side walls were finished with smooth surfaces by manual labor. A crew of men armed with grout, grinding stones and other various implements would first patch the small "pot" holes and the like with the grout and then, using a single grinding stone, would grind the surfaces of the side walls to provide them with smooth, finished surfaces. The job is generally disliked, since it is hard, tedious work and, to a degree, a health hazard due to the resulting concrete dust. This process is also costly, in view of time required to complete a job and the high cost of labor. Furthermore, uniformity in finish is limited by human error, and gauged by eye and feel.

As an example of the latter, it has been found that it requires between 30–40 man hours to finish approximately 250 feet of concrete railings, 18 to 21 inches in height. In other words, a crew of six to eight men, working for 5 hours.

With the apparatus shown and described in said copending application, this same job can normally be accomplished, using a crew of only three men, in approximately 4–5 hours. Or, in other words, in 12–15 man hours. This therefore represents a savings of 18–25 man hours, in finishing 250 feet of concrete railing. The apparatus of the present invention can provide a corresponding, if not greater, savings in man hours, in view of its improved construction.

In addition, the inherent uniformity of operation of the apparatus of the present invention can provide a finished surface which is comparable to, or better than, the finished surface normally provided by the manual labor.

The apparatus of the aforesaid copending application includes an undercarriage which rides on the top of an elongated wall-like member and which is positionably adjustable to position the grinding wheels as required. With the apparatus of the present invention, the undercarriage is fixedly secured, and the grinding wheels are each made positionably adjustable so that they may be positioned as required. Greater versatility is thereby provided. In addition, and more importantly, the apparatus is greatly simplified so that a less complex driving arrangement for both the apparatus and for the grinding wheels is required. Numerous other improvements have also been made, as will be apparent from the description which follows.

It is therefore an object of this invention to provide improved apparatus for finishing the side wall surface or surfaces of elongated wall-like members.

It is a further object of this invention to provide improved apparatus for finishing the side wall surface or surfaces of elongated wall-like members which provides a savings in man hours of 50–70 percent over doing the same job using manual labor. In this respect, it is a still further object to provide apparatus capable of providing a finished surface or surfaces which are comparable to, or better than, the finished surfaces normally provided by the manual labor.

It is a still further object to provide improved apparatus for finishing the side wall surface or surfaces of elongated wall-like members which is inexpensively manufactured, and which may be easily transported.

It is a still further object to provide improved apparatus for finishing the side wall surface or surfaces of elongated wall-like members which may be operated by one man.

It is still another object to provide improved apparatus of the above type which is extremely versatile in that it may be used to finish the side wall surface or surfaces of elongated wall-like members which have side walls of various heights and widths, within predetermined limits.

It is still another object to provide improved apparatus of the above type which may be used to finish the side wall surface or surfaces of elongated wall-like members which have sloped side walls, as well as perpendicular side walls.

It is still another object to provide improved apparatus of the above type which is sturdy in construction, hence requiring a minimum amount of maintenance, and which is easily adjusted to finish the side wall surface or surfaces of elongated wall-like members having various heights, widths and vertically arranged walls.

It is still another object to provide apparatus of the above type which is self-propelled, either in the forward direction or the reverse direction, at selectable predetermined speeds, and which has provisions for free-wheeling whereby it may be quickly advanced from one position to another.

It is still another object to provide apparatus of the above type which is completely self-contained. In this respect, it is still another object to provide apparatus which uses only a single source of power for its entire operation.

Other objects of the invention will in part be obvious and will in part appear hereinafter.

The invention accordingly comprise the features of construction, combinations of elements and arrangement of parts which will be exemplified in the following detailed disclosure, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Figure 1:
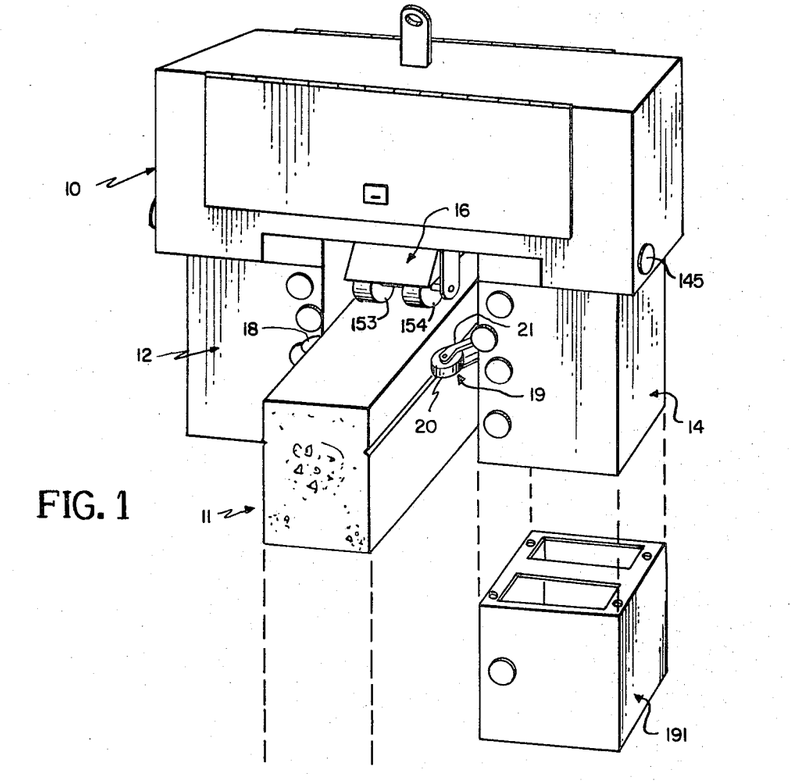
FIG. 1 is a front perspective view of a finishing machine exemplary of the present invention, shown positioned atop an elongated wall-like member.

Referring now to the drawings, in FIG. 1 a finishing machine 10 exemplary of the present invention is shown positioned atop an elongated wall-like member 11, which for the purpose of illustrating the invention is referred to as a concrete railing 11. The source of power, the driving gears and the like, which are described in detail hereinafter, are substantially enclosed within a cover, or housing, to protect the same from damage and from the elements, as well as dirt and the like, which may interfere with its proper operation.

The illustrative finishing machine 10 in its entirely has two downwardly projecting housing assemblies 12 and 14 which are positioned to straddle the concrete railing 11. A dirving wheel assembly 16 is positioned between the housing assemblies 12 and 14 and is arranged to transport the finishing machine 10 along the concrete railing, in either a forward or a reverse direction, at a selectable predetermined speed. Rotatably and slidably secured to the housing assemblies 12 and 14, respectively, are a number of grinding wheels 40–42 (FIG. 2), which grinding wheels are changeable in accordance with the particular type material being finished, which are yieldably engagable with the side wall surfaces of the concrete railing 11 to finish the same, as the finishing machine 10 is being driven along the concrete railing. Guide wheel assemblies 18 and 19 each of which includes a wheel rotatably fixed within a bracket, such as the wheel 20 rotatably fixed within bracket 21, are secured to the housing assemblies 12 and 14, preferably so as to engage the concrete railing 11 near its upper half, to assist in balancing and guiding the finishing machine 10.

Figure 2:
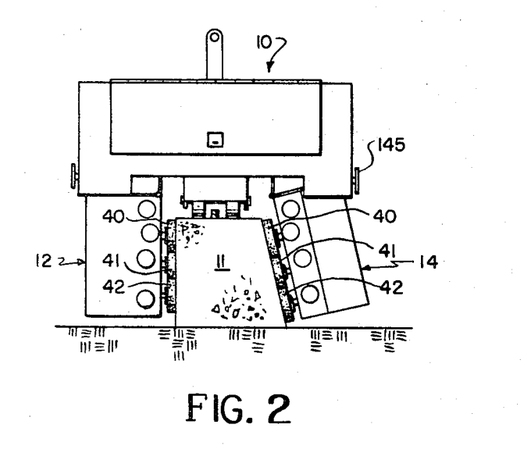
FIG. 2 is a front view of the finishing machine of FIG. 1 shown positioned atop an elongated wall-like member having a sloped side wall.

The housing assemblies 12 and 14 are hinged and arranged to be tilted, so that concrete railings having a sloped side wall, as shown in FIG. 2, may be finished with the finishing machine 10. This adjustment, as will be explained in detail, is readily achieved.

Also, the finishing machine 10 may be adapted to finish only one side wall of an elongated wall-like member, by replacing the housing assembly 12 or 14, with a supporting wheel assemblage which is arranged to support the finishing machine 10 atop the elongated wall-like member, in the manner described in the above mentioned copending application. The supporting wheel assemblage is also useful when a wall or the like has been constructed in an evacuation and there is not sufficient space between the wall and the evacuation to allow one or the other of the housing assemblies to travel therein.

Referring now to FIGS. 3–6, the construction of the finishing machine 10 is shown in detail. As may be best seen in FIGS. 3 and 4, the finishing machine 10 has a generally rectangular shaped main frame 22. A water tank 24 is mounted on the top side of the main frame 22, at its one end, and a gasoline engine 26 and a compressor 28 is mounted on top of the main frame 22, at its opposite end. A clutch assembly 29 is centrally positioned between the water tank 24 and the gasoline engine 26 and the compressor 28.

Secured beneath the main frame 22 and arranged to straddle the concrete railing 11, are two housing assemblies 12 and 14. As can be best seen in FIGS. 15–17, which shows the connection of one of the housing assemblies in detail, it can be seen that the housing assemblies each have a U-shaped bracket 32 secured between it and the main frame 22. The lower leg 33 (as shown) is hinged, at 34, to a vertically disposed portion 35, and the upper leg 36 (as shown) is formed of two L-shaped angle irons 37 and 38 (FIG. 17) which are fixedly secured to the vertically disposed portion 35 so as to provide a slot 39 therebetween. A bracket 130 (FIG. 16) including two threaded bolts 131 which are secured together in spaced relationship by means of two elongated, spaced apart bars 132. The bolts 131 are extended through the slot 39 between the angle irons 37 and 38 and through apertures (not shown) in the main frame 22 and nuts 133 threaded thereon to secure the housing assembly to the main frame 22.

Figure 15:
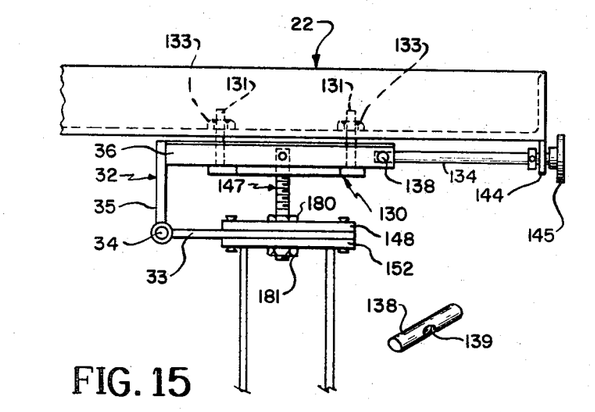
FIGS. 15, 16 and 17 are views illustrating the adjustable and pivotal connections between the housing assemblies and the main frame of the finishing machine.
Figure 16:
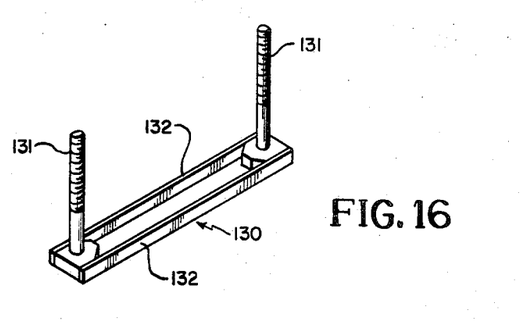
Figure 17:
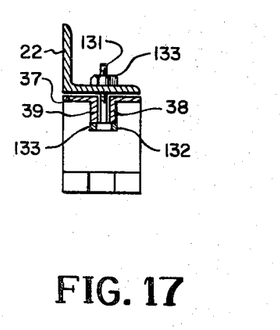

A stud 138 having a threaded aperture 139 is fixedly secured between the angle irons 37 and 38. An elongated rod 134 is extended through a flange 144 secured to the main frame 22, and its end is threaded through the aperture 139 in the stud 138. A wheel 145 is fixed to the opposite end of the rod 134. With this construction, it can be seen that by loosening the nuts 133, the housing assembly can be moved transversely to vary the spacing between the two housing assemblies, by turning the wheel 145 to thread the rod 134 into and out of the stud 138.

A threaded bolt 147 is pivotally secured at its one end between the angle irons 37 and 38. The opposite end of the bolt extends through enlarged apertures (not shown) formed in a fastening plate 148 which may be rectangular in shape, the leg 33 of the bracket 32 and a top plate 152 of the housing assembly. A pair of nuts 180 and 181 are threaded on the bolt 147 and are respectively positioned above the fastening plate 148 and below the top plate 152. It can be seen that by adjusting the nuts 180 and 181 that the housing assembly can be tilted, as desired, within limits.

The grinding wheel housing assemblies 12 and 14 each have three grinding wheels 40–42 secured thereto, respectively in a manner to be described more fully hereinafter. A pair of water supply lines 43 and 44 are arranged to supply water from the water tank 24 to the grinding wheels connected with the housing assemblies 12 and 14, respectively. Each of the water supply lines 43 and 44 have a flow control valve 45 for controlling the amount of water delivered to the grinding wheels.

The water supplied to the grinding wheels serves to lubricate them, as the side wall surfaces of the concrete railing 11 are being ground. The water is also supplied in a controlled amount so that the grinding wheels produce a "slurry," or mixture of water and concrete dust. This "slurry" is advantageously used to fill the "pot" holes and the slight irregularities in the side wall surfaces to thereby provide a smoothly finished surface on the side walls, simultaneously with the grinding operation as the finishing machine is being driven along the concrete railing. In addition, by controlling the amount of water supplied to the grinding wheels and using it to form a "slurry," the dust which normally results when concrete or the like is being ground is substantially, if not entirely, eliminated. The previously existing health hazard is therefore eliminated, and, in addition, as air compressor may be used, which under normal circumstances would be rendered inoperative in a short time as a result of the dust collecting into its piston chamber. The value of the air compressor of the finishing machine 10 will be apparent from the description which follows.

From the above description, it may be noted that at least a four-fold function is accomplished with the finishing machine 10 through the cooperative operation of the grinding wheels and the manner in which water is supplied thereto, namely: lubrication of the grinding wheels; production of a "slurry" which can be used to fill the small "pot" holes and irregularities in the side wall surfaces; elimination of the concrete dust which constitutes a health hazard; and, as a result of the latter, the ability to use an air compressor. The advantages provided by these functions are apparent, or will be apparent from the following detailed description.

Figure 8:
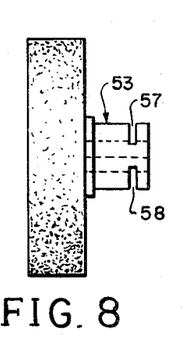
Figure 9:
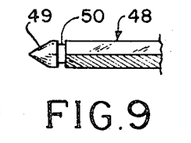
FIGS. 9 and 10 are a partial side view and a sectional view of the grinding wheel driving shaft.
Figure 10:
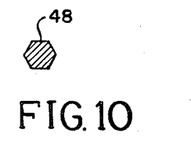
Figure 11:
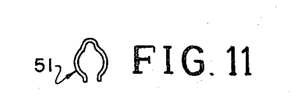
FIG. 11 is a front plan view of a locking pin.

Each of the grinding wheels 40-42 is coupled to a shaft 48 (FIGS. 4, 8 and 9) which is preferably polygonal in shape and has a substantially pointed end 49 and an annular groove 50 for receiving a U-shaped pin 51 (FIG. 11). The grinding wheels 40-42 each have a coupler 53 affixed thereto which has a correspondingly shaped shaft receiving cavity 55 formed centrally therein and a pair of oppositely opposed pin receiving slots 57 and 58. The grinding wheels are affixed to the shafts 48 by extending the end of the shaft into the cavity 55 and forcing the pin 51 through the slots 57 and 58 and into the annular groove 50 about the shaft. With this arrangement, the grinding wheels can be quickly and easily replaced, merely by removing the pin 51. The pointed end 49 on the shafts 48 provide a rather loose, sloppy fit between the shaft and the coupler and while the grinding wheels are fixedly secured to the shafts they are, to a degree, flexibly supported. With this arrangement, the grinding surface of the grinding wheels are held substantially flush against the surface of the concrete railing and follow the contour thereof.

Figure 13:
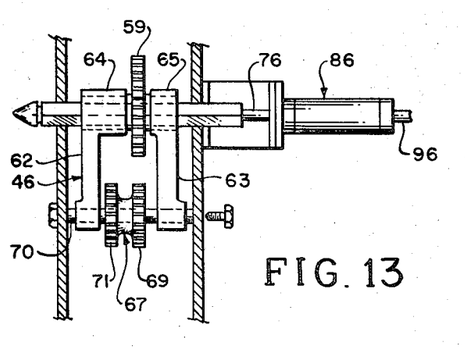
FIGS. 13 and 14 are a top and a side perspective view of a shaft support assembly.
Figure 14:
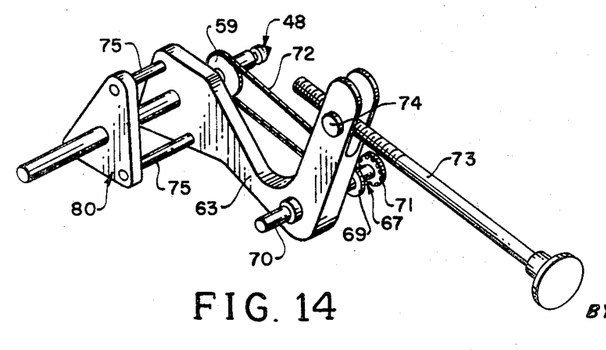

The shafts 48 are extended through the side walls 60 and 61 of the respective housing assemblies 12 and 14 (FIG. 4) and each is rotatably supported and slidably retained within a pair of bearings 64 and 65 secured within a shaft supporting assembly 46 (FIGS. 13 and 14).

Each of the shaft support assemblies 46 includes a pair of substantially L-shaped members 62 and 63, each of which is pivotally supported upon a shaft 70 which is rotatably secured to the side walls 60 and 61 of the housing assembly 12, or 14. A gear 59 is secured to the shaft 48, between the L-shaped members 62 and 63, and is adapted to be slidable thereon. A casting 67 formed to provide a pair of gears 69 and 71 is fixedly secured to the shaft 70. The gear 69 is coupled by means of a chain 72 to the gear 59 for driving it, and hence the shaft 48. The gear 71 drives the casting 67 and hence the gear 69, in a manner described more fully below.

The bearings 64 and 65 are secured within one arm of the respective members 62 and 63 near one end and substantially centrally thereof. The end of the other arm of the L-shaped member 63 is slotted and a rod 73 is threadedly received and retained within an aperture (not shown) in a pin 74 pivotally secured between the arms defining the slot. Each of the rods 73 extend through a rod support 78 secured to a front wall 17 of the respective housing assemblies 12 and 14 and has a wheel 81 secured to its end. As can be best seen in FIG. 6, by turning the wheel 81 the rod 73 is threaded into or out of the pin 74 and the L-shaped member 63 is thereby caused to pivot clockwise or counterclockwise about the shaft 70. This action, in turn, adjustably positions the grinding wheels, by raising and lowering the shafts 48 to which they are affixed, and each may be individually positioned as desired. With this arrangement, greater versatility is provided since the individual grinding wheels secured to each of the housing assemblies 12 and 14 can be positioned as desired.

A bracket 80 of an air cylinder 86 is secured to the arm of the L-shaped member 63, in spaced relation, by means of spacer rods 75. A piston 76 of the air cylinder 86 is connected to the end of the shaft 48, in the manner disclosed in the above identified copending application or any similar suitable manner, so that the shaft 48 may move transversely to the housing assembly 12 or 14, in a manner to be described, and may rotate without rotating the piston 76 within the cylinder of the air cylinder 86.

Each of the air cylinders 86 has a feed line coupled to it (such as the feed line 107 extending to the valve 93) which extends to respective ones of a number of valves 90–95 for individually controlling the air supplied to them. The valves 90–95 are supplied air from the compressor 28 secured to the top side of the main frame 22, through a flow control valve 96 and a fast shut off valve 97 which controls the supply of air to all of the valves 90–95. The air cylinders 86 urge their respective pistons 76 against the ends of the shafts 48 to slide the shafts transversely to the housing assembly 12, or 14 to yieldably urge the grinding surface of the grinding wheels 40–42 against the surface of the concrete railing 11.

Figure 3:
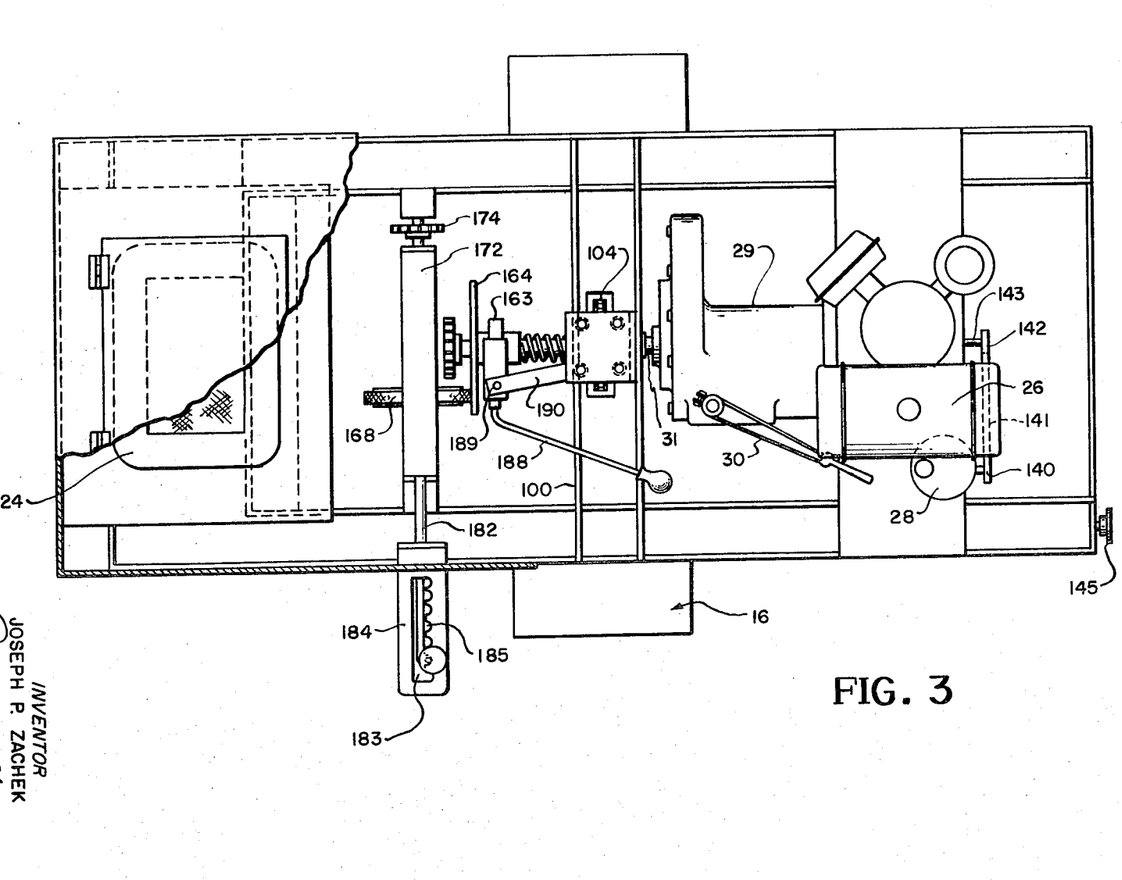
FIG. 3 is a top view of the finishing machine of FIG. 1.
Figure 4:
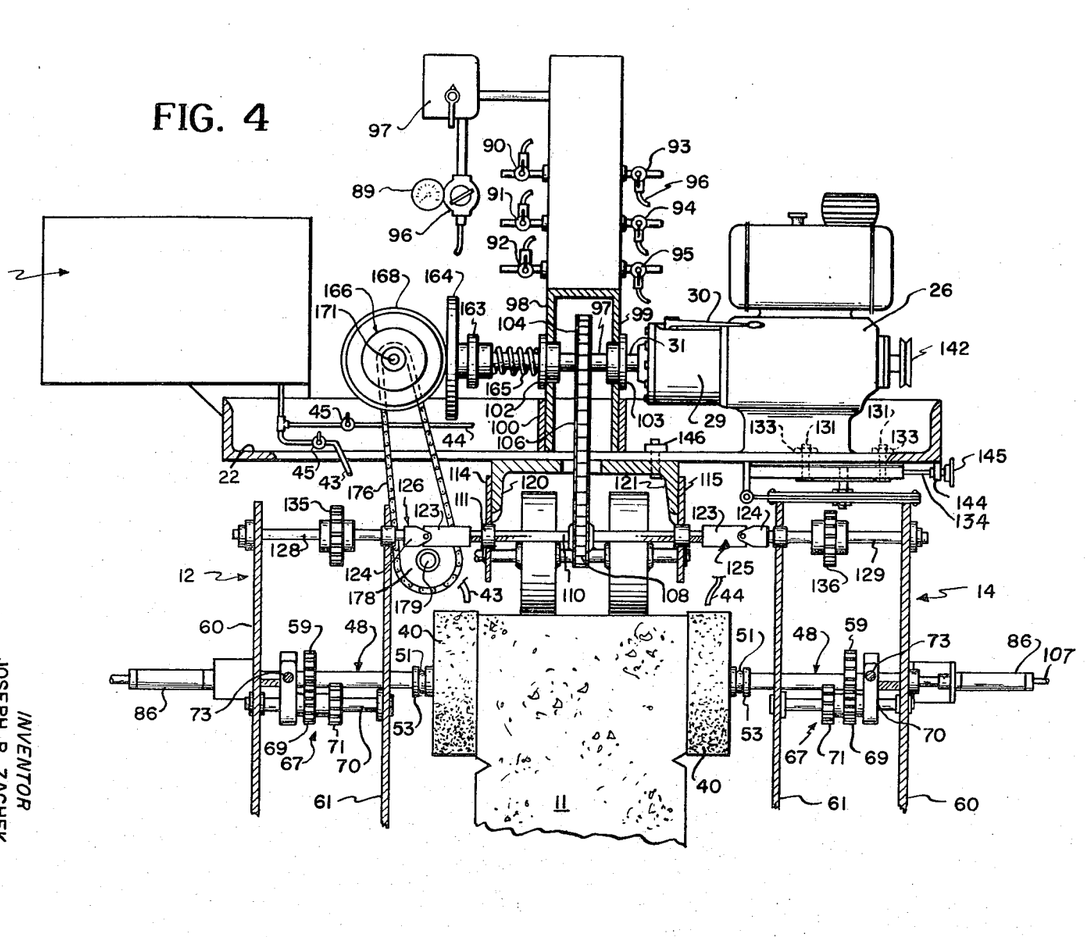
FIG. 4 is a front view of the finishing machine of FIG. 1 with its housing covers removed and with a number of its elements removed so as to more clearly disclose the construction thereof shown positioned atop an elongated wall-like member.
Figure 6:
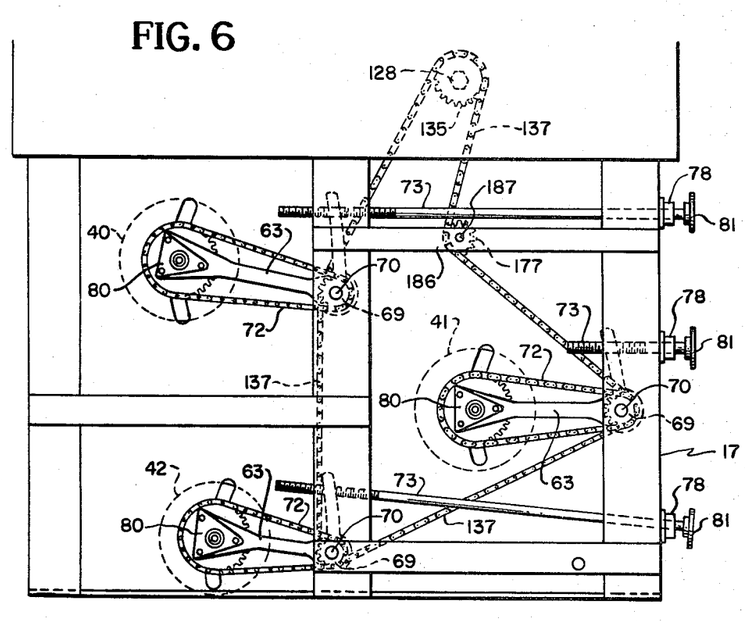
FIG. 6 is a side view of one of the housing assemblies.
Figure 7:
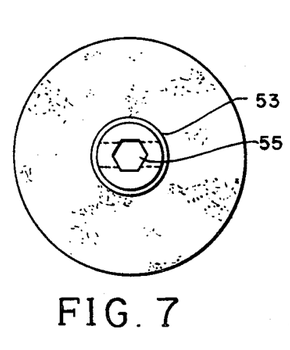
FIGS. 7 and 8 are front and side views, respectively, of one of the grinding wheels.
Figure 12:
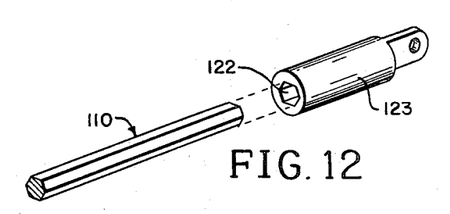
FIG. 12 is a partial perspective view illustrating the expandable coupling between the main driving shaft and the universal joints.

Referring now to FIGS. 3, 4 and 6, the driving arrangement for the grinding wheels 40–42 coupled to the respective housing assemblies 12 and 14 can be seen. The gasoline engine 26 has a clutch reduction assembly 29 affixed to it and may be a Wisconsin AENL single cylinder air cooled engine with a 6:1 clutch reduction assembly affixed to it, manufactured by Wisconsin Motors of Milwaukee, Wis. The clutch reduction assembly is operated by manipulating a lever arm 30. Its output shaft 31 is directly coupled to a shaft 97 fixedly retained between a pair of upright walls 98 and 99 secured to a cross member 100 of the main frame 22, by means of bearing assemblies 102 and 103. A gear 104 is fixedly secured to and driven by the shaft 97. The gear 104 is coupled by means of a chain 106 to a gear 108 fixedly secured to a main drive shaft 110. The main drive shaft 110 is rotatably retained within bearing assemblies 111 and 112 secured within respective ones of a pair of support plates 114 and 115 affixed to the side walls 120 and 121 of the driving wheel assembly 16. As can be best seen in FIG. 12, the main drive shaft 110 is polygonal in shape, and its opposite ends are slidably received within corresponding shaped cavities 122 formed in one of the members 123 of a pair of universal joints 125 and 126.

The second members 124 of respective ones of the universal joints 125 and 126 are fixedly secured to the ends of a pair of shafts 128 and 129. The shafts 128 and 129 are rotatably retained between the side walls 60 and 61 of the respective housing assemblies 12 and 14, and have gears 135 and 136 fixedly secured to and rotated by them, respectively. The gears 135 and 136 are coupled by means of chains 137 to each of the gears 69 secured to the pivot shafts 70 for each of the L-shaped members 63, as can be best seen in FIG. 6.

In operation, the gasoline engine 26, drives the main drive shaft 110, via the clutch reduction assembly 29, the gears 104 and 108 and the chain 106, and hence the gears 135 and 136 connected to the shafts 128 and 129. The gears 135 and 136 being coupled by means of the chains 137 to the gears 69 rotate the shafts 70, and hence the gears 67. The gears 67 being coupled to the gears 59 drive the shafts 48, to rotate the grinding wheels 40–42 affixed to each of the housing assemblies 12 and 14. The above described driving arrangement is preferably geared so as to have a ratio such that the grinding wheels 40–42 are driven at a rotational speed of approximately 100 revolutions per minute.

The universal joints 125 and 126 permit the housing assemblies 12 and 14 to be tilted, in the manner previously described, without damaging the shaft 110, and also permit the housing assemblies 12 and 14 to be spaced apart, at various distances, without having to add couplers to some type to the shaft 110.

In referring to FIG. 6, it may be noted that the grinding wheels 40–42 are triangularly positioned within the housing assembly 12 and 14, and are further positioned with respect to one another so that the grinding wheels can slightly overlap one another so that the entire surface of the concrete railing 11 can be finished. The grinding wheels 40, as shown, are 8″ grinding wheels while the grinding wheels 41 and 42 are all 6″ grinding wheels. With this arrangement, any size concrete railing up to approximately 18″ in height can be smoothly finished, by adjustably positioning the grinding wheels 40–42, by turning the wheels 81 secured to the rods 73.

Concrete railings having a slightly greater height can be finished by replacing the 6″ grinding wheels with 8″ grinding wheels. Also, concrete railings having even a greater height can be finished by affixing an adapter unit 191 to one or both of the housing assemblies 12 and 14. The adapter unit may have one or more grinding wheels affixed to it and operable in the same above described manner to engage and to position the grinding wheels. With the adapter unit 191 attached, the driving chain 137 is replaced with a longer chain which is drivingly engaged with all of the driving gears 69.

A chain tightening assembly 186 is provided in each of the housing assemblies 12 and 14 to keep the driving chains 137 securely engaged with the driving gears 69. The chain tightening assembly 186 includes a shaft 187, having a gear 177 rotatably secured to it and adapted to engage the driving chain 137 to keep it tight. The shaft may be spring biased for this purpose.

As previously stated, the air cylinders 86 coupled to the ends of the shafts 48 yieldably urged the grinding wheels 40–42 against the surfaces of the concrete railing 11. The air pressure for activating the air cylinders is provided by the compressor 28, the output of which is coupled to each of the air cylinders 86 by means of the individual feed lines. The air compressor 28 has a pulley 140 which is coupled by means of a pulley belt 141 to a pulley 142 secured to the drive shaft 143 of the gasoline engine 26. The air compressor 28 preferably delivers a pressure of at least 20 p.s.i. to the air cylinders, since this value has been found to provide satisfactory results. The flow control valve 96 included in the supply line from the air compressor can be adjusted to regulate the air pressure supplied to the valves 90–95. A pressure gauge 89 is provided, so that the actual pressure delivered to the valves is known. The valves, in turn, control the air pressure to the individual air cylinders.

The driving wheel assembly 16 is fixedly secured by means of fastening means such as nut and bolt assemblies 146 beneath the main frame 22, between the housing assemblies 12 and 14. The center of gravity of the finishing machine 10 is preferably located over the axis of the driving wheel assembly 16, so that the finishing machine 10 is substantially balanced on the driving wheel assembly when it is positioned atop the concrete railing 11, as shown in FIG. 4.

Figure 5:
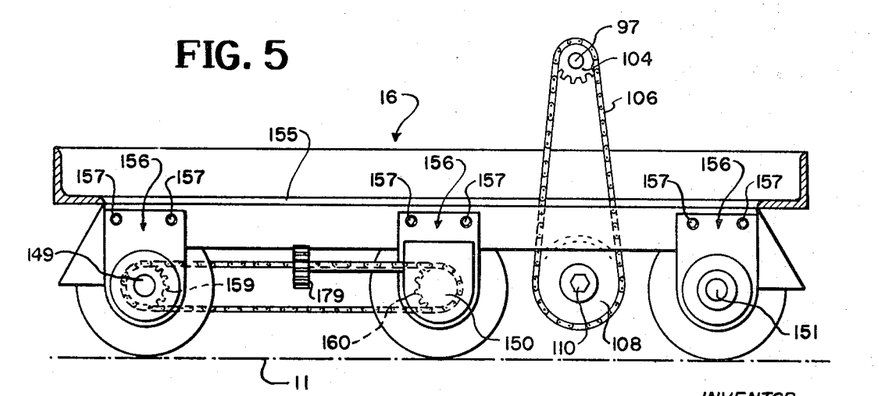
FIG. 5 is a partial side view illustrating the driving wheel assembly.

The drving wheel assembly 16, as may be best seen in FIG. 5, has three axles 149–151, each of which has two driving wheels, such as driving wheels 153 and 154 (FIG. 1) connected to axle 150, rotatably secured thereto, in spaced relation so as to ride atop the concrete railing 11. The axles 149–151 are rigidly secured to a housing assembly 155 by means of bearing retaining plate members 156 secured to the housing assembly 155 by means of threaded screws 157 or the like. Also, secured to the axles 149 and 150, between the side walls 120 and 121, are gears 159 and 160, coupled to one another by a chain 161, for driving the wheels of the driving wheel assembly. As will be explained more fully hereinafter, the axle 150 is driven by means of a gear reduction assembly (not shown) coupled thereto, and drives the axle 149 and hence the finishing machine 10. The gear reduction assembly may have a gear reduction ratio of 50:1, and with this ratio the finishing machine may be driven along the concrete railing 11 at a speed of between approximately 1 foot per minute to 2 feet per minute, depending on the speed selected, in the manner to be described.

The driving wheel assembly 16 is drivingly coupled to the gasoline engine 26, and is driven thereby, through a clutching and gearing arrangement, which may be best seen in FIGS. 3–5. The shaft 97 which is directly coupled to the output shaft 31 of the clutch reduction assembly 29 has a coupler 163 having a circular clutch plate 164 secured thereto slidably received on its end. Between the coupler 163 and the bearing assembly 102 is a spring 165 which resiliently urges the coupler 163, and hence the clutch plate 164, against the peripheral edge of a friction plate 166. The friction plate 166 preferably has a rubber coating 168 or the like about its peripheral edge so as to frictionally engage the clutch plate 164.

The friction plate 166 is slidable on a splined shaft 171 secured within a shaft support member 172 (FIG. 3) by means of bearing assemblies (not shown) secured to its end walls (not shown). Secured to the end of the shaft 171 is a gear 174 which is coupled by means of a chain 176 (FIG. 4) to a gear 178. The gear 178 is, in turn, connected to the end of an input shaft 179 for the gear reduction assembly.

In operation, the shafts 31 and 97 are rotated by means of the gasoline engine 26 and the clutch reduction assembly 29. The clutch plate 164 is therefore likewise rotated, and its rotation is transferred to the shaft 171 through the medium of the friction plate 166 which has its peripheral edge frictionally engaged with the clutch plate. The gear 174 secured to the end of the shaft 171 is therefore rotated and rotates, by means of the chain 176, the gear 178 which is secured to the end of the input shaft 179 for the gear reduction assembly coupled to the axle 150. The axle 150 on being rotated drives the axle 149 and hence the driving wheel assembly 16.

The above described clutching arrangement is arranged to provide a neutral and three selectable speeds, in either a forward or reverse direction. This is accomplished by adjusting the position of the friction plate 166 with respect to the clutch plate 164, by means of a rod 182 coupled to the friction plate 166. As may be best seen in FIG. 3, one end of the rod 182 is positioned within an elongated slot 183 formed in a selector plate 184 connected to the main frame 22 of the finishing machine 10. The elongated slot 183 in the selector plate has a notch 185 defining a neutral position and three notches on each side of the notch 185 defining three forward speeds and three reverse speeds, respectively. The end of the rod 182 is adjusted within the elongated slot 183 to position the friction plate 166 to the right or to the left of the axis of the clutch plate 164, or to center the friction plate adjacent to the axis of the clutch plate. The center portion about the axis of the clutch plate 164 is dished so that the friction plate 166 does not engage the clutch plate when the friction plate is positioned adjacent the axis of the clutch plate. This provides the neutral position for the finishing machine 10, and the end of the rod 182 is accordingly arranged to be positionable within the notch 185 in the speed selector plate 184. When the friction plate 166 is positioned to engage the clutch plate 184 to the right of the axis of the clutch plate, as shown in FIG 3, and the end of the rod 182 is engaged in a notch forward (as shown) of notch 184, the finishing machine 10 will be transported in a forward direction. Correspondingly, when the friction plate is positioned to engage the clutch plate to the left (as shown) of the axis of the clutch plate, machine 10 is transported in a reverse direction. When the friction plate 166 is positioned in the last described position, the end of the rod 182 is engaged in one or the other of the notches aft of the notch 185 in the speed selector plate 184.

To change speeds, or the direction of travel, of the finishing machine 10, a lever arm 188 connected to the coupler 163 is pushed toward the left (as shown in FIG. 3). Since the lever arm 188 and the coupler 163 are pivotally connected by means of a pivot pin 189 to the member 190, the coupler will be slidably urged on the shaft 97 to bear against the spring 165 and to disengage the clutch plate 164 from the friction plate 166. While the clutch plate 164 is disengaged, the end of the rod 182 is moved to the left to disengage it from the notches in the selector plate 184 and then moved either fore or aft, depending on the speed and the direction of travel desired, so that the friction plate 166 is properly positioned to engage the clutch plate 164 to cause the machine 10 to travel in the proper direction, at the proper speed. The lever arm 188 is then released and the spring 165 will resiliently urge the coupler 163, and hence the clutch plate 164, to again engage the friction plate 166.

It is frequently desired to transport the finishing machine 10 from one position to another on the concrete railing 11 at a faster rate of travel then that provided by the driving arrangement described above. The finishing machine 10 can be "free wheeled" in a rapid manner by merely removing a key (not shown) which couplingly engages the gear reduction assembly with the shaft 150. Therefore, by removing the key, the finishing machine 10 may be rapidly transported from one position to another on the concrete railing 11 and the key then replaced to re-engage the driving mechanism so that the finishing machine driven, as previously described.

The flexible coupling between the grinding wheels and the shafts is particularly valuable in maintaining the grinding surface of the grinding wheel flush against the side wall surfaces. In operating the finishing machine 10, it may be tilted, slightly, from side to side of the concrete railing 11 as it is driven along the concrete railing. In such cases, if the grinding wheels were rigidly coupled to the shafts, the grinding surface of the grinding wheels would not be uniformly forced against the side wall surface and ridges or the like would be ground therein. Being flexibly coupled to the shafts, however, the grinding surface of the grinding wheels are held flush against the side wall surface and will follow its contour, hence the chance of this undesirable result occurring is substantially, if not completely, eliminated.

The numerous features and advantages of the finishing machine 10 in finishing the side wall surfaces of concrete railings are apparent from the above detailed description of its construction and its operation. It is also apparent from this detailed description that the finishing machine 10 may be used for finishing the surface or surfaces of other types of elongated wall-like members which are made of concrete, such as the side walls of swimming pools, the side walls of storage basins in sewage disposal plants; provided the elongated wall-like member is sufficiently strong to support the finishing machine.

The finishing machine 10 may also be used to "plaster," or finish, the surfaces of walls built of cement blocks or the like. In this respect, the excess mortar used to bind the cement blocks or the like together is not removed, in fact, an excessive amount is desired, so that a sufficient "slurry" is formed, in the manner described above, to, in effect "plaster" the surface of the cement blocks, as the finishing machine 10 is driven along the top thereof.

It is not intended that the finishing machine 10 be limited to finishing the side wall surface or surfaces of elongated wall-like members having a particular height, since it is readily apparent that the housing assemblies 12 and 14 can be easily lengthened, and a corresponding number of grinding wheels, and the mechanism associated therewith, added.

It is also apparent that the finishing machine 10 can be used to finish side walls constructed of, for example, wood or any other type of material which may be finished by polishing, sanding or the like. The grinding wheels 40–42 are merely replaced wheels, sanding wheels or the like, as required for the particular job at hand.

The method

The method, according to the present invention, of finishing a surface, or surfaces, is as follows: The overall surface, or surfaces, to be finished are ground at one time with grinding means while the grinding means are simultaneously being advanced over the surface, or surfaces. In cases where the surface, or surfaces, being finished is concrete or the like, water is dripped onto the grinding means. The grinding means are uniformily yieldably urged against the surface, or surfaces concurrent with regulated wetting of removed particles to form a slurry in intimate contact with the ground surface, or surfaces.

In cases where the surface, or surfaces, being finished is of a material such as wood or the like, the step of dripping water onto the grinding means is eliminated. The method in such case is therefore as follows: grinding the overall surface, or surfaces, to be finished at one time, while simultaneously advancing the grind means and uniformly yieldably urging the grinding means against the surface, or surfaces.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. Apparatus for finishing the side wall surfaces of walls comprising, in combination: a frame; a pair of housing assemblies secured beneath said frame in spaced relation so as to straddle a wall, each of said housing assemblies having a plurality of finishing means attached thereto for finishing at least one of said surfaces, means for rotating said finishing means, means for positionably adjusting each of said finishing means independent of one another to finish various predetermined vertical surface areas; and a driving assembly fixedly mounted beneath said frame between said housing assemblies and arranged to ride on a top surface of said wall.

2. Apparatus, as claimed in claim 1, wherein each of said housing asemblies has a plurality of support shafts rotatably secured thereto; said finishing means each being coupled to an associated one of said support shafts; said means for rotating said finishing means being coupled to said support shafts for rotating them; and means coupled to said support shafts for pivotally adjusting said support shafts to position them longitudinally.

3. Apparatus, as claimed in claim 1, including a plurality of pivot shafts secured within each of said housing assemblies; a shaft support assembly pivotally secured to each of said pivot shafts; a support shaft rotatably and slidably secured within each of said shaft support assemblies; said finishing means being affixed to the end of each of said support shafts; said means for rotating said finishing means being coupled to and rotatably driving said support shafts; and adjusting means affixed to and individually operable to pivot each of said shaft support assemblies to adjustably position said finishing means.

4. Apparatus, as claimed in claim 3, further including a first and a second gear coupled to each of said pivot shafts; a third gear rotatably secured to each of said support shafts; first coupling means for coupling said first gear secured to one of said pivot shafts to said third gear of the shaft support assembly secured to the same pivot shaft; second coupling means for coupling said second gears to one another; and said means for rotating said finishing means being coupled to and driving said coupling means.

5. Apparatus, as claimed in claim 4, further including a main driving shaft extending transversely across said apparatus; a driving gear in each of said housing assemblies secured to said main driving shaft, said second coupling means coupling said second gears and said driving gear therein to one another; said means for rotating said finishing means comprising motor means mounted on said frame and coupled to said main driving shaft for rotating it.

6. Apparatus, as claimed in claim 5, further including coupling means for coupling said motor means to said driving wheel assembly to operate it to drive said apparatus.

7. Apparatus, as claimed in claim 2, further including means coupled to the opposite ends of each of said plurality of support shafts for slidably urging and yieldably maintaining said finishing means in engagement with said side wall surfaes, said means comprising an air cylinder, an air compressor secured to said frame and coupled to each of said air cylinders for activating said air cylinders; a source of power secured to said frame; and means coupling said source of power with said second coupling means, said air compressor and said driving assembly, for operating the same, whereby a single source of power is required for operating and for driving said apparatus.

8. Apparatus, as claimed in claim 2, wherein each of said support shafts is polygonal in cross section and has a tapered end and an annular groove formed therein adjacent said tapered end; each of said finishing means having a coupler affixed thereto which has a corresponding polygonal shaped cavity formed therein for receiving the tapered end of a support shaft and a pair of slots for receiving a U-shaped locking pin which is adapted to engage said annular groove, said tapered end within said cavity providing a flexible coupling between said finishing means and said support shaft.

9. Apparatus, as claimed in claim 1, including a plurality of pivot shafts secured within each of said housing assemblies, a generally L-shaped shaft support assembly pivotally secured to each of said pivot shafts, a support shaft rotatably and slidably secured within each of said shaft support assemblies in one leg thereof, said finishing means being affixed to the end of each of said support shafts, and adjusting means affixed to the other leg of each of said shaft support assemblies and individually operable to pivot each of said shaft support assemblies to adjustably position said finishing means.

10. Apparatus, as claimed in claim 9, wherein said adjusting means comprise threaded screws threadedly extending through the legs of said shaft support assemblies, said screws upon being rotated being threaded into and out of said legs and causing said shaft support assemblies to pivot.

References Cited

UNITED STATES PATENTS

| 1,044,423 | 11/1912 | Rosa | 51—180 |
| 1,308,933 | 7/1919 | Cavicchi | 51—180 |
| 1,947,286 | 2/1934 | Bitterbaum | 51—180 |
| 2,075,369 | 3/1937 | Stetler | 51—180 |
| 2,787,096 | 4/1957 | Riddels et al. | 51—180 |
| 3,296,748 | 1/1967 | Talley | 51—180 |
| 3,327,433 | 6/1967 | Goss et al. | 51—283 |
| 3,348,342 | 10/1967 | Zachek | 51—180 |

LESTER M. SWINGLE, *Primary Examiner.*